United States Patent
Iwasawa

(10) Patent No.: US 9,610,722 B2
(45) Date of Patent: Apr. 4, 2017

(54) HOT-RUNNER MOLDING APPARATUS AND HOT-RUNNER NOZZLE

(71) Applicant: Olympus Corporation, Tokyo (JP)

(72) Inventor: Koki Iwasawa, Akiruno (JP)

(73) Assignee: Olympus Corporation, Tokyo (JP)

( * ) Notice: Subject to any disclaimer, the term of this patent is extended or adjusted under 35 U.S.C. 154(b) by 32 days.

(21) Appl. No.: 14/484,721

(22) Filed: Sep. 12, 2014

(65) Prior Publication Data
US 2014/0377401 A1 Dec. 25, 2014

Related U.S. Application Data

(63) Continuation of application No. PCT/JP2013/075592, filed on Sep. 20, 2013.

(30) Foreign Application Priority Data

Sep. 27, 2012 (JP) ................. 2012-215162

(51) Int. Cl.
*B29C 45/27* (2006.01)
*B29C 45/00* (2006.01)
*B29C 45/20* (2006.01)
*B29L 11/00* (2006.01)

(52) U.S. Cl.
CPC ........ *B29C 45/278* (2013.01); *B29C 45/0046* (2013.01); *B29C 45/20* (2013.01); *B29C 45/27* (2013.01); *B29C 2045/0086* (2013.01); *B29C 2045/2779* (2013.01); *B29L 2011/0016* (2013.01)

(58) Field of Classification Search
CPC .... B29C 2045/2779; B29C 2045/0086; B29C 45/20; B29C 45/27; B29C 45/278; B29C 45/0046; B29L 2011/0016

USPC ......................................................... 425/572
See application file for complete search history.

(56) References Cited

U.S. PATENT DOCUMENTS 2,217,661 A * 10/1940 Anderson ............. B29C 45/262
    164/347
2,298,044 A * 10/1942 Dinzl .................. B29C 45/4005
    425/156
2,446,872 A * 8/1948 Ehlers ....................... B28B 1/24
    106/178.1

(Continued)

FOREIGN PATENT DOCUMENTS

JP     H07-232353 A     9/1995
JP     2000-326361 A     11/2000

(Continued)

OTHER PUBLICATIONS

International Search Report issued for PCT/JP2013/075592, date of mailing Dec. 17, 2013.

(Continued)

*Primary Examiner* — Alison L Hindenlang
*Assistant Examiner* — Emmanuel S Luk
(74) *Attorney, Agent, or Firm* — Arent Fox LLP

(57) ABSTRACT

A hot-runner molding apparatus includes a hot-runner nozzle, a hot-runner molding die and a runner unit. The positions of outflow hole portions are arranged rotationally-symmetrical with respect to the positions of the runner groove portions in such a manner that the molten resin is equally distributed from a gate hole portion to the runner groove portions.

10 Claims, 10 Drawing Sheets

(56) References Cited

U.S. PATENT DOCUMENTS

| | | | | |
|---|---|---|---|---|
| 3,822,856 A * | 7/1974 | Gellert | B29C 45/2735 | 249/105 |
| 3,977,820 A * | 8/1976 | Beyerlein | B29C 45/22 | 425/464 |
| 4,017,242 A * | 4/1977 | Mercer | B29C 45/2725 | 425/543 |
| 4,126,292 A * | 11/1978 | Saeki et al. | B29C 45/2704 | 249/110 |
| 4,290,744 A * | 9/1981 | Dannels | B29C 45/561 | 264/328.7 |
| 4,299,553 A * | 11/1981 | Swaroop | B29C 45/2725 | 137/561 A |
| 4,312,630 A * | 1/1982 | Travaglini | B29C 45/27 | 219/421 |
| 4,332,537 A * | 6/1982 | Slepcevic | B29C 45/14 | 249/110 |
| 4,344,750 A * | 8/1982 | Gellert | B29C 45/2735 | 219/523 |
| 4,345,892 A * | 8/1982 | Schulte | B29C 45/2735 | 264/328.9 |
| 4,370,122 A * | 1/1983 | Dannels | B29C 45/2735 | 264/328.7 |
| 4,909,725 A * | 3/1990 | Ward | B29C 45/2703 | 264/328.12 |
| 5,208,052 A * | 5/1993 | Schmidt | B29C 45/27 | 219/421 |
| 5,268,184 A * | 12/1993 | Gellert | B29C 45/27 | 264/328.15 |
| 5,269,676 A * | 12/1993 | Gellert | B29C 45/27 | 264/328.15 |
| 5,464,343 A * | 11/1995 | Hepler | B29C 45/2737 | 425/549 |
| 5,551,863 A * | 9/1996 | Hepler | B29C 45/2737 | 264/328.15 |
| 5,624,691 A * | 4/1997 | Bednarz | B29C 45/2701 | 264/272.17 |
| 5,683,731 A * | 11/1997 | Deardurff | B29C 45/30 | 264/328.12 |
| 5,736,171 A * | 4/1998 | McGrevy | B29C 45/2735 | 264/328.15 |
| 5,780,077 A * | 7/1998 | von Holdt | B29C 45/27 | 264/328.9 |
| 5,820,899 A * | 10/1998 | Gellert | B29C 45/2735 | 264/328.15 |
| 5,846,477 A * | 12/1998 | Hotta | B29C 45/14655 | 264/272.14 |
| 5,849,236 A * | 12/1998 | Tatham | B29C 45/2704 | 264/297.2 |
| 5,851,565 A * | 12/1998 | Garver | B29C 45/2737 | 264/328.15 |
| 5,871,786 A * | 2/1999 | Hume | B29C 45/2711 | 264/328.15 |
| 5,879,727 A * | 3/1999 | Puri | B29C 45/27 | 264/328.15 |
| 5,885,628 A * | 3/1999 | Swenson | B29C 45/27 | 264/328.15 |
| 6,062,846 A * | 5/2000 | Kalemba | B29C 45/27 | 264/328.15 |
| 6,220,851 B1 * | 4/2001 | Jenko | B29C 45/27 | 264/328.15 |
| 6,245,278 B1 * | 6/2001 | Lausenhammer | B29C 45/27 | 264/328.1 |
| 6,264,461 B1 * | 7/2001 | Churchwell | B29C 45/14688 | 425/572 |
| 6,302,680 B1 * | 10/2001 | Gellert | B29C 45/2711 | 425/549 |
| 6,478,567 B1 * | 11/2002 | Kushnir | B29C 45/27 | 425/191 |
| 6,609,902 B1 * | 8/2003 | Blais | B29C 45/27 | 264/328.15 |
| 6,776,599 B2 * | 8/2004 | Street | H01L 21/565 | 257/E21.504 |
| 7,252,498 B2 * | 8/2007 | Olaru | B29C 45/27 | 264/328.15 |
| 7,803,306 B2 * | 9/2010 | Babin | B29C 45/2703 | 264/328.9 |
| 7,845,936 B2 * | 12/2010 | Babin | B29C 45/27 | 425/572 |
| 8,241,032 B2 * | 8/2012 | Klobucar | B29C 45/2703 | 425/570 |
| 8,246,342 B2 * | 8/2012 | Gunther | B29C 45/2735 | 264/328.8 |
| 8,287,272 B1 * | 10/2012 | Adas | B29C 45/27 | 264/328.8 |
| 2002/0009516 A1 * | 1/2002 | Jenko | B29C 45/27 | 425/549 |
| 2002/0098262 A1 * | 7/2002 | Babin | B29C 45/2735 | 425/562 |
| 2002/0168442 A1 * | 11/2002 | Gould | B29C 45/27 | 425/549 |
| 2003/0124216 A1 * | 7/2003 | Guenther | B29C 45/27 | 425/549 |
| 2003/0211199 A1 * | 11/2003 | Eigler | B29C 45/27 | 425/571 |
| 2004/0185137 A1 * | 9/2004 | Hashemi | B29C 33/06 | 425/549 |
| 2004/0234646 A1 * | 11/2004 | Benenati | B29C 45/27 | 425/567 |
| 2005/0095313 A1 * | 5/2005 | Ciccone | B29C 45/27 | 425/569 |
| 2006/0113407 A1 * | 6/2006 | Ciccone | B29C 45/278 | 239/583 |
| 2006/0228442 A1 * | 10/2006 | Fischer | B29C 45/2727 | 425/572 |
| 2007/0134367 A1 * | 6/2007 | Zoppas | B29C 45/27 | 425/568 |
| 2007/0172538 A1 * | 7/2007 | Adas | B29C 45/27 | 425/568 |
| 2007/0178186 A1 * | 8/2007 | Goinski | B29C 45/27 | 425/569 |
| 2007/0212444 A1 * | 9/2007 | Fairy | B29C 45/27 | 425/564 |
| 2009/0236774 A1 * | 9/2009 | Blais | B29C 45/2725 | 264/328.8 |
| 2013/0056562 A1 * | 3/2013 | Overfield | B29C 45/2735 | 239/583 |

FOREIGN PATENT DOCUMENTS

| | | |
|---|---|---|
| JP | 2008-143157 A | 6/2008 |
| JP | 2010-184387 A | 8/2010 |
| JP | 2010-208290 A | 9/2010 |
| JP | 2010-214765 A | 9/2010 |

OTHER PUBLICATIONS

Notification of Transmittal of Translation of the International Preliminary Report on Patentability, issued for PCT/JP2013/075592, date of mailing Apr. 9, 2015.

Japanese First Office Action issued for Patent Application No. 2014-538472, mailing date Sep. 27, 2016 (English translation attached).

* cited by examiner

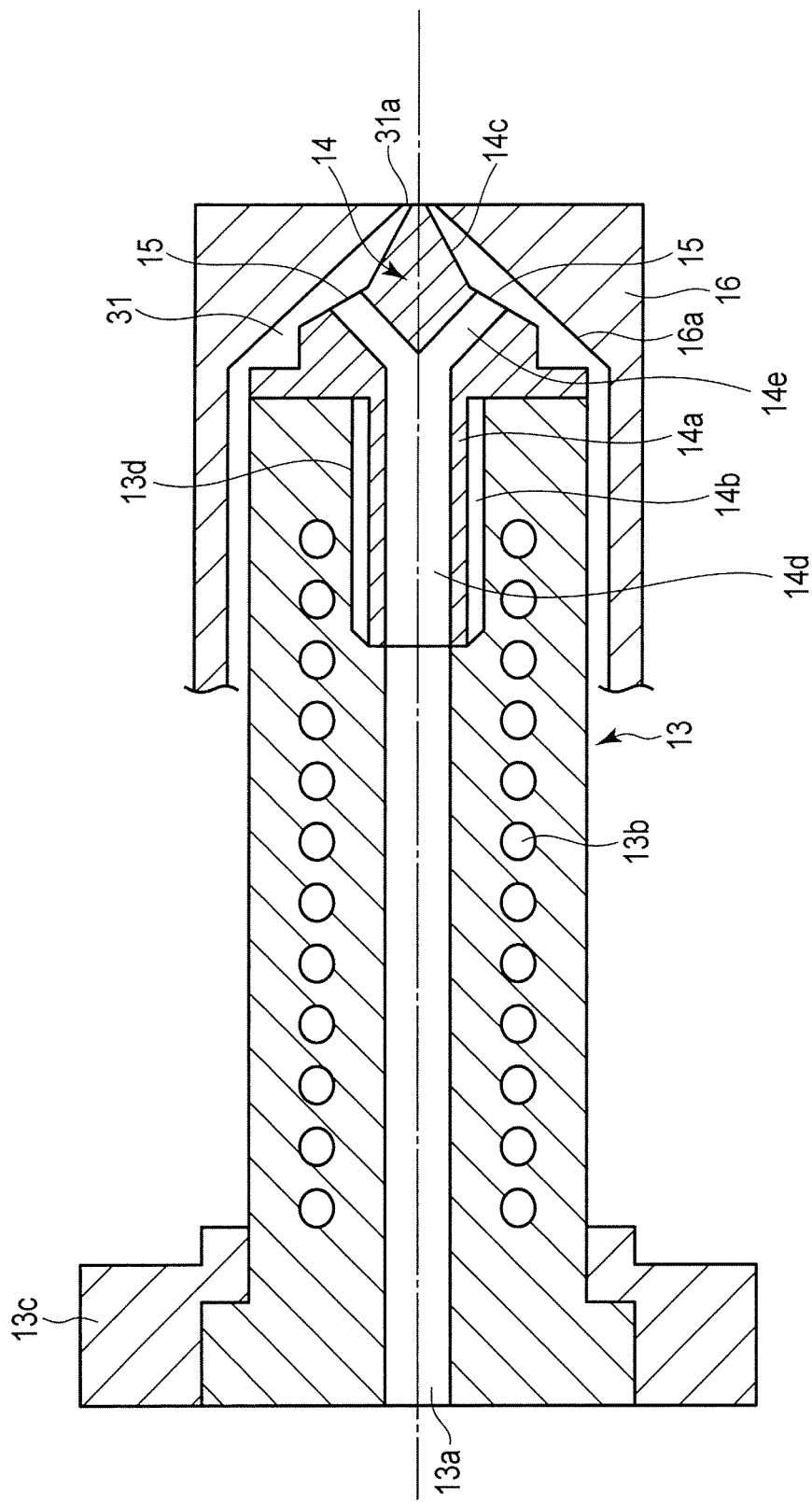
F I G. 2

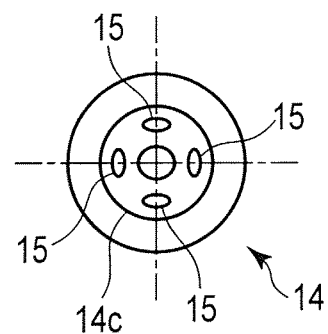
F I G. 4A
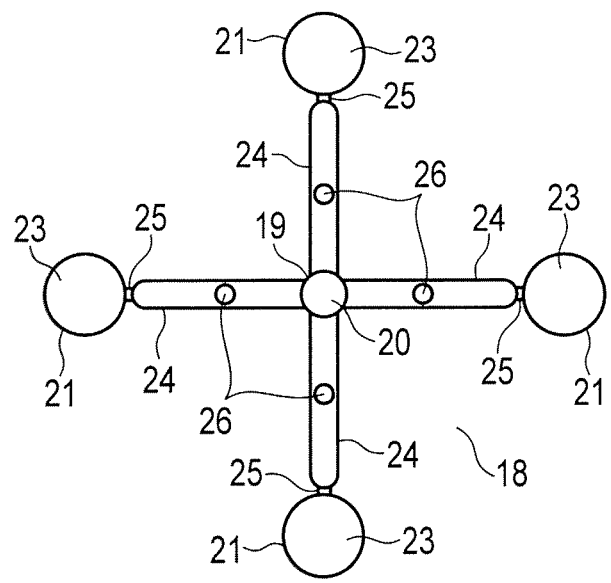
F I G. 4B

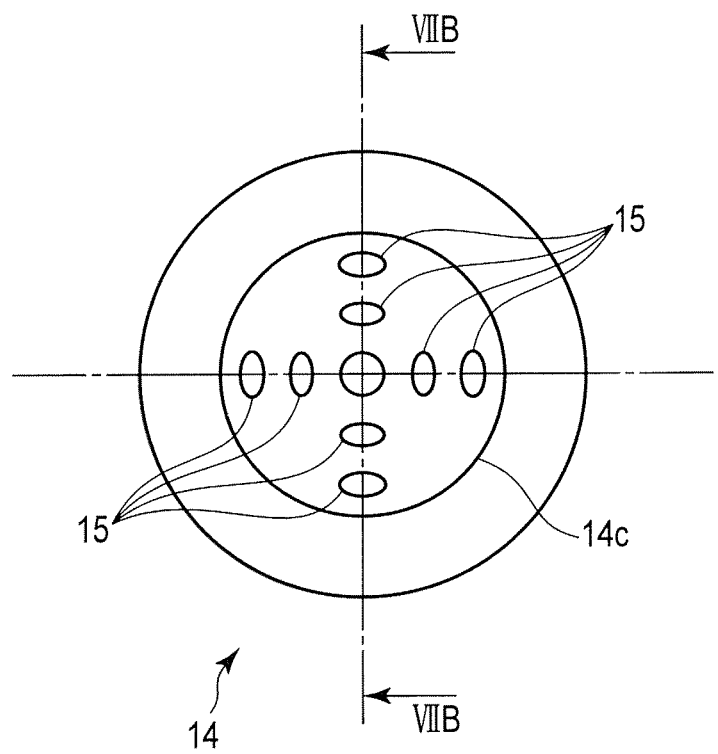
F I G. 7A

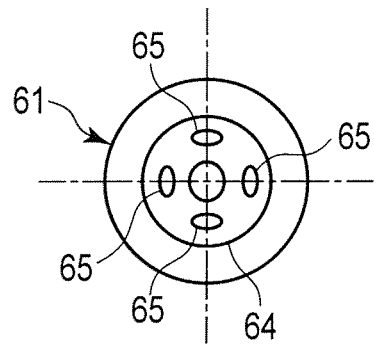
F I G. 10
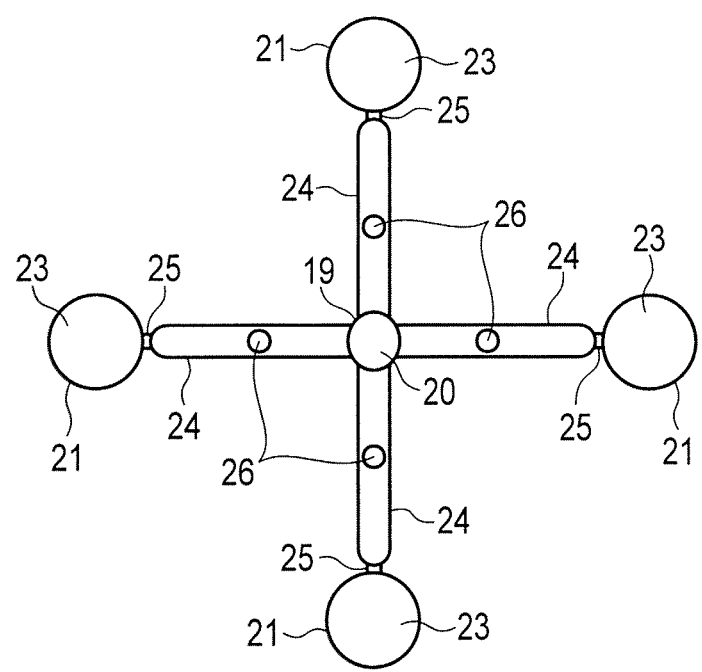
F I G. 11

HOT-RUNNER MOLDING APPARATUS AND HOT-RUNNER NOZZLE

CROSS-REFERENCE TO RELATED APPLICATIONS

This application is a Continuation Application of PCT Application No. PCT/JP2013/075592, filed Sep. 20, 2013 and based upon and claiming the benefit of priority from prior Japanese Patent Application No. 2012-215162, filed Sep. 27, 2012, the entire contents of all of which are incorporated herein by reference.

BACKGROUND OF THE INVENTION

1. Field of the Invention

The present invention relates to a hot-runner molding apparatus and a hot-runner nozzle in injection molding for injecting a molten resin into a cavity by a hot runner to provide a molded article such as an optical element.

2. Description of the Related Art

In general, an optical element made of a resin functions as a small lens for use in, for example, a digital camera, an endoscope, a microscope, or a mobile phone. Such an optical element made of a resin is generally molded by injection molding. Recently, in order to reduce the impact on the environment and decrease waste material given that resin material used for optical elements is more expensive than materials used for general constituent components, the optical element is molded by using a hot runner. Since the hot runner sends a molten resin injected from an injection molding machine into a cavity through a resin channel maintained at a high temperature, an amount of material in the resin channel that ends up as waste material can be reduced. Therefore, at present, various forms of hot runners are suggested from many manufacturers.

Jpn. Pat. Appln. KOKAI Publication No. H07-232353 discloses, for example, an open torpedo-type hot runner. In this open torpedo-type hot runner, a torpedo portion arranged at a tip of a hot-runner nozzle is heated at a central portion of a nozzle hole portion. The nozzle hole portion is provided in a molding die and cools a resin. Therefore, the resin at the nozzle tip has high fluidity controllability, and thus a dripping or stringing phenomenon when the nozzle is enlarged, or a gate clogging phenomenon that prevents injection by clogging the gate with the resin when the nozzle is made smaller, hardly occurs. Therefore, this hot runner is suitable for molding precision components requiring strict external appearance quality or strict form accuracy. Furthermore, the molten resin is sent to a position near the nozzle tip through one channel, and branches to a plurality of hole portions at the nozzle tip. As a result, a pipeline resistance of the resin channel is reduced, and the resin can be injected using low pressure.

An end tip having a nozzle can be replaced with respect to a tip holder. Due to such replacement, the shape of the tip can be changed due to changing a resin or a product shape, and it has been proposed that a channel area can also be changed. In the replacement, the tip holder has a screw hole portion into which the end tip is fitted. Moreover, the end tip has a male screw portion that is formed at a proximal end portion of the end tip and screwed into the screw hole portion.

BRIEF SUMMARY OF THE INVENTION

An aspect of a hot-runner molding apparatus of the present including a hot-runner nozzle that includes: an axial center channel portion which is arranged on a center axis of the hot-runner nozzle and through which a molten resin flows; and outflow channel portions which are arranged at a distal end portion of the hot-runner nozzle to be branched from the axial center channel portion toward a lateral side of the axial center channel portion and has outflow hole portions from which the molten resin flows out; a tubular hot-runner molding die into which the distal end portion of the hot-runner nozzle is inserted in such a manner so that a channel portion which is arranged between an outer peripheral surface of the distal end portion of the hot-runner nozzle and an inner peripheral surface of the hot-runner molding die and which communicates with the outflow hole portions, and a gate hole portion which is arranged between a distal end portion of the outer peripheral surface and a distal end portion of the inner peripheral surface and communicates with the channel portion are formed; and a multi-piece runner unit which has runners branched from the gate hole portion in a radial pattern and forms molded articles at the same time, wherein the positions of the outflow hole portions are arranged rotationally-symmetrical with respect to the positions of the runners in such a manner that the molten resin is equally distributed from the gate hole portion to the runners.

An aspect of a hot runner of the present including an axial center channel portion which is arranged on a central axis of the hot runner and through which a molten resin flows; and outflow hole portions which are arranged at a distal end portion of a hot-runner nozzle to be branched from the axial center channel portion toward a lateral side of the axial center channel portion and from which the molten resin flows out, wherein the distal end portion of the hot-runner nozzle is inserted into a tubular hot-runner molding die in such a manner so that a channel portion which is arranged between an outer peripheral surface of the distal end portion of the hot-runner nozzle and an inner peripheral surface of the hot-runner molding die and which communicates with the outflow hole portions, and a gate hole portion which is arranged between a distal end portion of the outer peripheral surface and a distal end portion of the inner peripheral surface and communicates with the channel portion are formed, and wherein the positions of the outflow hole portions are arranged rotationally-symmetrical with respect to the positions of runners of a runner unit in such a manner that the molten resin is equally distributed to the runners of the runner unit branched from the gate hole portion in a radial pattern.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a longitudinal cross-sectional view showing a primary part of a hot-runner nozzle of the hot-runner molding apparatus according to the first embodiment;

FIG. 4A is a plan view showing a first modification of the hot-runner molding apparatus according to the first embodiment and also showing an arrangement state of a resin outflow hole portions of the hot-runner nozzle;

FIG. 4B is a plan view showing the first modification and also showing an arrangement state of a movable runner of the hot-runner molding apparatus;

FIG. 7A is a plan view showing an arrangement state of resin outflow hole portions of a hot-runner nozzle in a fourth modification of the hot-runner molding apparatus according to the first embodiment;

FIG. 10 is a plan view showing an arrangement state of resin outflow hole portions of a hot-runner nozzle of the hot-runner molding apparatus according to the second embodiment from a direction of an arrow A in FIG. 9; and FIG. 11 is a plan view showing an arrangement state of a movable runner of the hot-runner molding apparatus according to the second embodiment from a direction of an arrow B in FIG. 9.

DETAILED DESCRIPTION OF THE INVENTION

First Embodiment

Configuration

Figure 1:
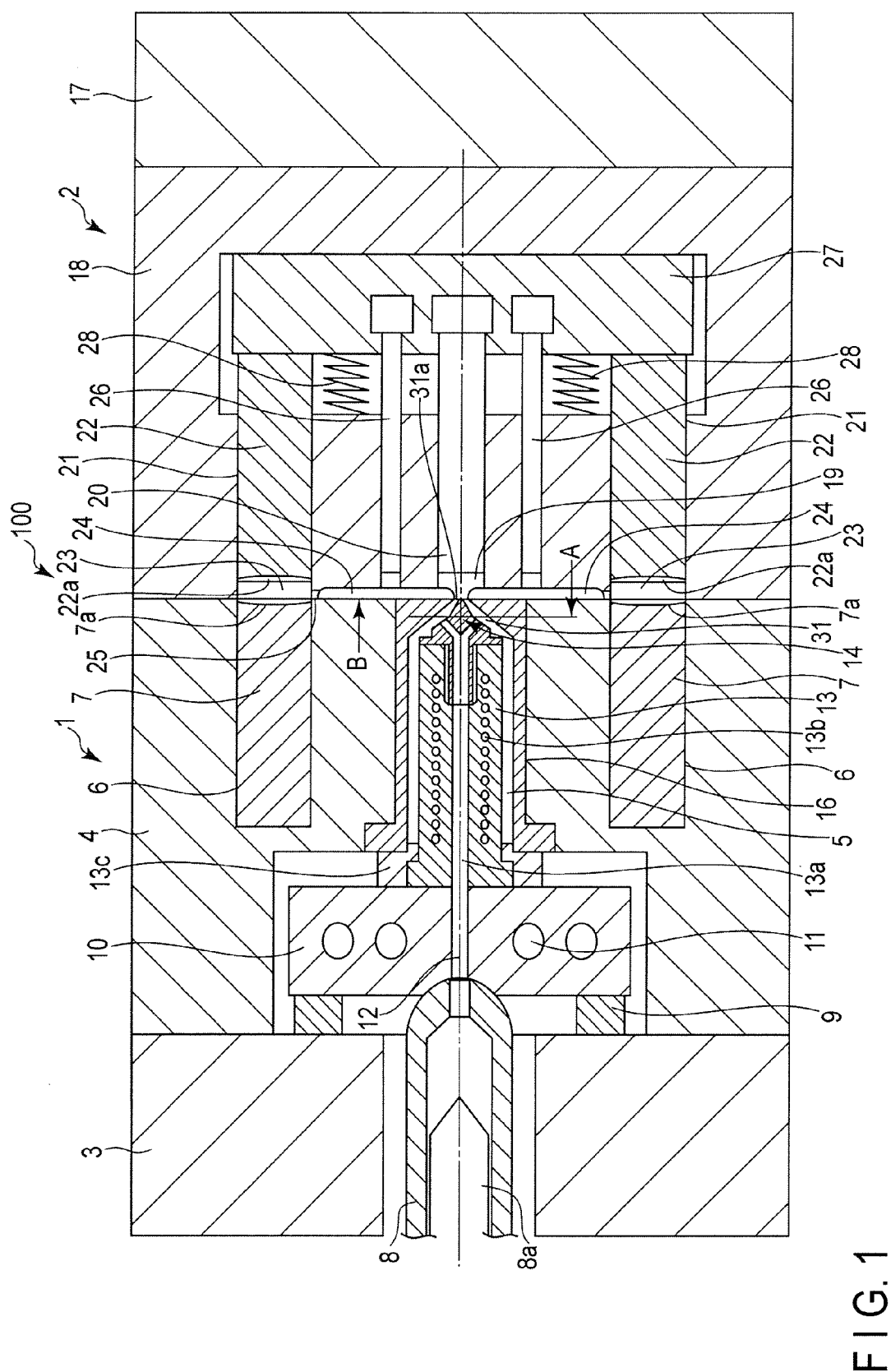
FIG. 1 is a longitudinal cross-sectional view showing a hot-runner molding apparatus according to a first embodiment of the present invention.

FIG. 1, FIG. 2, FIG. 3A, and FIG. 3B show a first embodiment according to the present invention. FIG. 1 shows a block diagram of a hot-runner molding apparatus 100 that functions for injection molding apparatus according to this embodiment. The hot-runner molding apparatus 100 according to this embodiment is a multi-piece molding apparatus 100 that molds a plurality of molded articles at the same time. In this embodiment, for example, a four-piece molding apparatus is shown. The hot-runner molding apparatus 100 has a fixed-side die (which will be referred to as a fixed die 1 hereinafter) and a movable side die (which will be referred to as movable die 2 hereinafter) opposedly arranged to be openable/closable with respect to this fixed die 1.

[Fixed Die 1]

The fixed die 1 has a fixed-side base 4 disposed on a fixed-side platen 3. The fixed-side base 4 has a hot-runner mounting hole portion 5 arranged at a central part of the fixed-side base 4. Also, the fixed-side base 4 has fixed-side core insertion hole portions 6 arranged around this hot-runner mounting hole portion 5. The same number of the fixed-side core insertion hole portions 6 as the number of molded pieces formed at the same time are arranged on a joining surface (a parting surface) with respect to the movable die 2. Therefore, in this embodiment, the four fixed-side core insertion hole portions 6 are arranged. The fixed-side core insertion hole portions 6 are arranged at equal intervals each other. Additionally, the fixed-side base 4 has, for example, columnar fixed-side cores 7 that are inserted into the fixed-side core insertion hole portions 6, respectively. Each fixed-side core 7 has a fixed-side molding portion 7a that is arranged at a distal end portion of the fixed-side core 7 and forms an optical molding surface of a molding cavity. The fixed-side cores 7 are assembled to the fixed-side core insertion hole portions 6, respectively.

The fixed-side platen 3 has an injection nozzle 8 of a non-illustrated injection molding machine attached at a central part of the fixed-side platen 3. Note that a plunger 8a of the injection nozzle 8 is arranged in the injection nozzle 8. The fixed die 1 has a manifold 10 disposed on the fixed-side platen 3 through a riser pad 9. The riser pad 9 is made of ceramics having high thermal insulation. The manifold 10 has heaters 11 that can heat the entire manifold 10. Furthermore, the manifold 10 has a resin channel portion 12 arranged at a central part of the manifold 10 to be coupled with the injection nozzle 8.

The hot-runner molding apparatus 100 has, for example, a cylindrical hot-runner nozzle 13 arranged on the manifold 10 so as to be arranged on the opposite side of the injection nozzle 8. A proximal end portion of the hot-runner nozzle 13 is disposed on the manifold 10 in a state so that the hot-runner nozzle 13 is inserted in the hot-runner mounting hole portion 5. The hot-runner nozzle 13 has an axial center channel portion 13a which is arranged on a central axis of the hot-runner nozzle 13 and through which a molten resin flows. The axial center channel portion 13a functions as a hole portion. A proximal end portion of the axial center channel portion 13a is coupled with an opening portion on a downstream side of a resin channel portion 12. The hot-runner nozzle 13 has hot-runner heaters 13b that are provided surround the axial center channel portion 13a and that heat the hot-runner nozzle 13 including the resin flowing through the axial center channel portion 13a. A proximal end portion of the hot runner nozzle 13 is disposed on the manifold 10 through a hot-runner holder 13c.

As shown in FIG. 2, the hot-runner nozzle 13 has an end tip 14 detachably disposed on a distal end portion of the hot-runner nozzle 13. When the end tip 14 is disposed on the distal end portion of the hot-runner nozzle 13, a central axis of the end tip 14 is coaxial with a central axis of the hot-runner nozzle 13. Here, a distal end portion of the axial center channel portion 13a has a screw hole portion 13d. Furthermore, the end tip 14 has a cylindrical portion 14a arranged at a proximal end portion of the end tip 14. This cylindrical portion 14a has a male screw portion 14b that is formed on an outer peripheral surface of the cylindrical portion 14a and screwed into the screw hole portion 13d. Thus, in a state that the male screw portion 14b is screwed in the screw hole portion 13d, the axial center channel portion 13a is able to communicate with an inner cavity of the cylindrical portion 14a.

Additionally, the hot-runner nozzle 13 has an axial center channel portion 14d which communicates with the axial center channel portion 13a when the end tip 14 is disposed on the distal end portion of the hot-runner nozzle 13 and is arranged on the center axis of the end tip 14 and inside the same, and also has outflow channel portions 14e which communicate with the axial center channel portion 14d, are arranged inside of the distal end portion of the end tip 14 as the distal end portion of the hot-runner nozzle 13 to be branched on a lateral side of the axial center channel portion 14d from the axial center channel portion 14d and the molten resin flows from the axial center channel portion 14d. The outflow channel portions 14e are branched from the axial center channel portion 14d and inclined with respect to the center axis of the hot-runner nozzle 13.

Figure 3A:
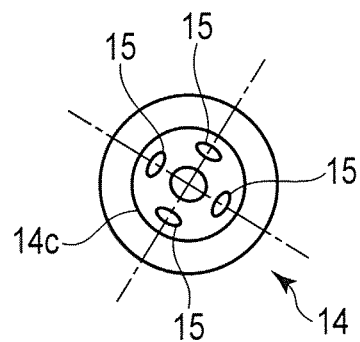
FIG. 3A is a plan view showing an arrangement state of resin outflow hole portions of the hot-runner nozzle of the hot-runner molding apparatus according to the first embodiment from a direction of an arrow A in FIG. 1.

Furthermore, the end tip 14 has a substantially conical tip head portion 14c arranged at the distal end portion of the end tip 14. This tip head portion 14c has resin outflow hole portions 15 that are formed on an outer peripheral surface of the tip head portion 14c and through which the molten resin flows to the outside. The resin outflow hole portions 15 function as part of the outflow channel portions 14e and communicate with the outflow channel portions 14e. The same number of the resin outflow hole portions 15 as the number of molded articles formed at the same time are arranged. Therefore, in this embodiment, as shown in FIG. 3A, the four resin outflow hole portions 15 are arranged. As shown in FIG. 3A, the resin outflow hole portions 15 are arranged at equal intervals. This arrangement can be likewise applied to the outflow channel portions 14e. The same number of the outflow channel portions 14e and the same number of the resin outflow hole portions 15 as later-described runners 24 are arranged. At the distal end of the hot-runner nozzle 13, the molten resin is branched along the four outflow channel portions 14e from the one axial center channel portion 14d and injected from the respective resin outflow hole portions 15 to the outside. Therefore, the hot-runner nozzle 13 according to this embodiment functions as an open torpedo-type in which the resin channel is branched into four channels at the distal end of the hot-runner nozzle 13.

The hot-runner molding apparatus 100 has a substantially cylindrical hot-runner bushing 16 attached to the hot-runner mounting hole portion 5. The hot-runner bushing 16 functions as a hot-runner molding die. This hot-runner bushing 16 is assembled to cover outer peripheral surfaces of the hot-runner nozzle 13 and the end tip 14 to interpose a predetermined gap therebetween. The hot-runner bushing 16 has a conical tapered guide surface 16a that functions as an inner peripheral surface of a distal end portion of the hot-runner bushing 16 and is arranged along a conical shape of the end tip 14 of the hot-runner nozzle 13. A space portion is formed between this guide surface 16a and the outer peripheral surface of the end tip 14, and this space portion functions as a ring-shaped resin channel portion 31. Furthermore, a ring-shaped gate hole portion (an injection gate) 31a is formed between a distal end portion of the guide surface 16a of the hot-runner bushing 16 arranged at the distal end portion of the ring-shaped resin channel portion 31 and a distal end portion of the end tip 14. The center of the gate hole portion 31a is arranged on the center axis of the hot-runner nozzle 13.

As described above, the hot-runner molding apparatus 100 has the tubular hot-runner molding die into which the distal end portion of the hot-runner nozzle is inserted in such a manner so that the ring-shaped resin channel portion 31 which is arranged between the outer peripheral surface of the tip head portion 14c as the distal end portion of the hot-runner nozzle 13 and the guide surface 16 as the inner peripheral surface of the hot-runner bushing 16 and which communicates with the resin outflow hole portions 15, and a gate hole portion 31a which is arranged between the distal end portion of the outer peripheral surface and the distal end portion of the inner peripheral surface and communicates with the distal end portion of the ring-shaped resin channel portion 31 are formed.

[Movable Die 2]

The movable die 2 has a movable side base 18 that is oppositely arranged to be openable/closable with respect to the fixed die 1 and disposed on a movable platen 17. The movable side base 18 has a center pin mounting hole portion 19 arranged at a position where it faces the hot-runner mounting hole portion 5 of the fixed die 1. The movable side base 18 has a center pin 20 that is arranged in the center pin mounting hole portion 19 and is slidable in the center pin mounting hole portion 19.

Additionally, the movable side base 18 has four movable side core insertion hole portions 21 arranged at positions where they face the four fixed-side core insertion hole portions 6 of the fixed-side base 4. The movable side base 18 has movable side cores 22 that are arranged in the four movable side core insertion hole portions 21, face the fixed-side cores 7, and are slidable in the movable side core insertion hole portions 21 along a mold clamping direction. Each movable side core 22 has a movable side molding portion 22a that is arranged at a distal end portion of the movable side core 22 and forms an optical molding surface of a molding cavity. A cavity 23 having a shape of a molded article is formed between the fixed-side core 7 and the movable side core 22, specifically between the fixed-side molding portion 7a and the movable side molding portion 22a.

Figure 3B:
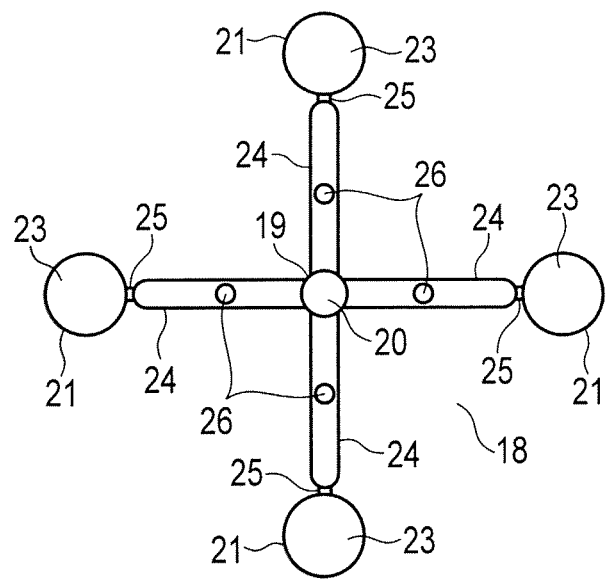
FIG. 3B is a plan view showing an arrangement state of a movable runner of the hot-runner molding apparatus from a direction of an arrow B in FIG. 1.

The movable side base 18 that functions as a runner unit has four runner groove portions 24 as linear grooves that are arranged on a surface of the movable side base 18 which comes into contact with the fixed-side base 4 and branches from a gate hole portion 31a (a center pin mounting hole portion 19) in a radial pattern. As shown in FIG. 3B, the four runner groove portions 24 are arranged at equal intervals and also arranged to form a cross, for example. Therefore, the runner groove portions 24 are orthogonal to each other. The movable side base 18 has gates 25 that are arranged at ends of the fourth runner groove portions 24 and communicate with cavities 23, respectively.

The movable side base 18 has four ejector pins 26 that communicate with the four runner groove portions 24, respectively. The ejector pins 26 are slidable in an opening/closing direction. Furthermore, the center pin 20, the four movable side cores 22, and the four ejector pins 26 are disposed on the same projection plate 27. Note that the projection plate 27 has spring members 28 that energize the projection plate 27 in a mold opening direction. Thus, the projection plate 27 is driven in a mold closing direction by a non-illustrated actuator against spring force of the spring members 28. Residual material in the four runner groove portions 24 are projected by the four ejector pins 26. As a result, the molded articles in the cavities 23 can be projected integrally with the residual material in the four runner groove portions 24.

(Function)

A function of the hot-runner molding apparatus 100 according to the present invention having the above-described configuration will now be described. At the time of using the hot-runner molding apparatus 100 (at the time of replenishing the molten resin) according to this embodiment, the molten resin injected from the injection nozzle 8 runs through the resin channel portion 12 of the manifold 10 and flows from the axial center channel portion 13a to the four outflow channel portions 14e and the four resin outflow hole portions 15 through the axial center channel portion 14d without being substantially cooled.

Additionally, the molten resin flows from the resin outflow hole portions 15 into the ring-shaped resin channel portion 31 formed between the guide surface 16a of the hot-runner bushing 16 and the end tip 14 of the hot-runner nozzle 13. Then, the molten resin flows into the ring-shaped gate hole portion 31a arranged at the distal end of the ring-shaped resin channel portion 31 from the ring-shaped resin channel portion 31. Furthermore, the four cavities 23 are filled with the molten resin from the gate hole portion 31a through the four runner groove portions 24.

Here, the molten resin that has flowed into the end tip 14 from the axial center channel portion 13a of the hot-runner nozzle 13 is branched into four directions along the four outflow channel portions 14e. At this time, each resin outflow hole portion 15 is arranged symmetrical with the center axis of the hot-runner nozzle 13 at the center. This point is the same for each runner groove portion 24. Thus, the positions of the resin outflow hole portions 15 are arranged rotationally-symmetrical with respect to the positions of the runner groove portions 24. Therefore, the molten resin that has flowed from the four resin outflow hole portions 15 into the ring-shaped resin channel portion 31 flows through all of the four runner groove portions 24 from the gate hole portion 31a at the same velocity. Accordingly, the molten resin is then equally distributed to the four cavities 23 through the four runner groove portions 24 and fills the respective cavities 23.

(Effect)

Thus, the hot-runner molding apparatus 100 having the above-described configuration achieves the following effect. That is, in this embodiment, the positions of the four resin outflow hole portions 15 are arranged to be rotationally-symmetrical with respect to the positions of the four runner groove portions 24 in such a manner that the molten resin can be equally distributed from the gate hole portion 31a to the four runner groove portions 24. Here, the same number of the resin outflow hole portions 15 as the runner groove portions 24 are arranged. As a result, the channels through which the resin injected from the hot-runner nozzle 13 reaches the molded article cavities 23 from the four resin outflow hole portions 15 through the four runner groove portions 24 and the gates 25, are the same in all the cavities 23. Therefore, a filling velocity is the same in all the cavities 23, and molded articles such as optical elements having a high shape accuracy can be obtained.

Therefore, in this embodiment, when the channels for the resin injected from the single hot-runner nozzle 13 into the four runner groove portions 24 through the four resin outflow hole portions 15 of the end tip 14 and the ring-shaped gate hole portion 31a are formed into the same shape with a simple member configuration, a difference in velocities of the resin flowing through the respective runner groove portions 24 can be eliminated, and the hot-runner molding apparatus 100 using the cavities 23 that can form molded articles such as optical elements with high shape accuracy that does not differ for each cavity 23 can be provided.

Moreover, in this embodiment, the end tip 14 is detachable. As a result, even in a molding die having a different number of pieces to be molded, the number of the resin outflow hole portions 15 can be connected with the number of the runner groove portions 24 merely by replacing the end tip 14 without replacing the entire hot-runner nozzle.

Additionally, in this embodiment, the outflow channel portions 14e are branched from the axial center channel portion 14d and inclined with respect to the center axis of the hot-runner nozzle 13. As a result, as compared with an example where the outflow channel portions 14e are linearly arranged along the center axis of the hot-runner nozzle 13, a length of each channel portion is increased. Therefore, the molten resin flowing through the outflow channel portions 14e can be heated for a longer time, and fluidity controllability of the molten resin can be enhanced. Thus, it is possible to avoid the occurrence of a dripping or stringing phenomenon when the resin outflow hole portions 15 are large and a gate clogging phenomenon that disables injection by clogging of the resin outflow hole portions 15 with resin when the resin outflow hole portions 15 are small. Furthermore, a pipeline resistance is reduced, and the resin can be injected with low pressure.

First Modification of First Embodiment

Configuration

FIG. 4A and FIG. 4B show a first modification of the hot-runner molding apparatus 100 according to the first embodiment. FIG. 4A is a plan view showing an arrangement state of the resin outflow hole portions 15 of the end tip 14, and FIG. 4B is a plan view showing an arrangement state of the runner groove portions 24 of the movable die 2. It is to be noted that, in FIG. 4A and FIG. 4B, like reference numerals denote portions equivalent to those in the first embodiment, thus a description thereof is omitted.

In this modification, the four resin outflow hole portions 15 are arranged in the end tip 14, and the four runner groove portions 24 are arranged in the movable side base 18. That is, the same number of resin outflow hole portions 15 as the number of runner groove portions 24 are arranged. Moreover, the four resin outflow hole portions 15 shown in FIG. 4A are arranged in a state where they are positioned in the same directions as the arrangement directions of the four runner groove portions 24 shown in FIG. 4B.

(Function/Effect)

In this modification, the positions of the four resin outflow hole portions 15 and the positions of the four runner groove portions 24 are arranged in a positional relationship so that they form the same angle from the center axis of the hot-runner nozzle 13 toward the circumferential direction. Therefore, the pressure loss caused due to an injection resistance of the resin injected from the four resin outflow hole portions 15 is not observed, and the resin smoothly flows through the four runner groove portions 24. Accordingly, an injection pressure can be reduced. Thus, the filling velocity is the same in all of the four cavities 23, and a filling velocity difference between the cavities 23 can be further effectively reduced. As a result, it is possible to provide the hot-runner molding apparatus 100 that can form molded articles such as optical elements with good shape accuracy that does not differ depending on each cavity 23. Additionally, in this modification, since the resin channels become shortest and the pressure loss can be reduced, responsiveness is enhanced with a low load, and each molded article with good shape accuracy can be provided.

Note that the number of the resin outflow hole portions 15 of the hot-runner nozzle 13 and the number of the runner groove portions 24 are four in this modification, but equally or symmetrically arranging these members and forming the respective resin channels into the same shape or symmetrical shapes can suffice.

Second Modification of First Embodiment

Configuration

Figure 5A:
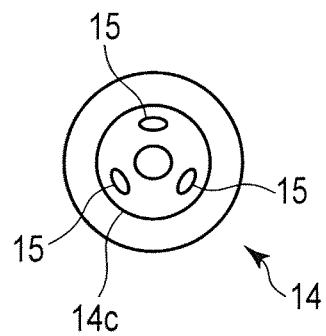
FIG. 5A is a plan view showing a second modification of the hot-runner molding apparatus according to the first embodiment and also showing an arrangement state of resin outflow hole portions of a hot-runner nozzle.
Figure 5B:
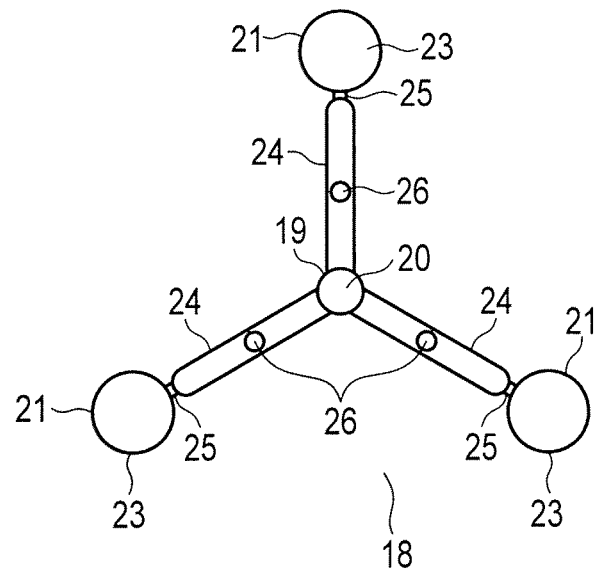
FIG. 5B is a plan view showing the second modification and also showing an arrangement state of a movable runner of the hot-runner molding apparatus.

FIG. 5A and FIG. 5B show a second modification of the hot-runner molding apparatus 100 according to the first embodiment. FIG. 5A is a plan view showing an arrangement state of the resin outflow hole portions 15 of the end tip 14, and FIG. 5B is a plan view showing an arrangement state of the runner groove portions 24 of the movable die 2. Note that, in FIG. 5A and FIG. 5B, like reference numerals denote parts equivalent to those in the first embodiment, thus a description thereof is omitted.

In this modification, three resin outflow hole portions 15 are arranged in the end tip 14, and three runner groove portions 24 are arranged in the movable base 18. That is, the same number of the resin outflow hole portions 15 as the runner groove portions 24 are arranged. Additionally, the three resin outflow hole portions 15 shown in FIG. 5A are arranged in a state that they are positioned in the same directions as the arrangement directions of the three runner groove portions 24 shown in FIG. 5B.

(Function/Effect)

In this modification, the positions of the equally-provided three resin outflow hole portions 15 and the positions of the three runner groove portions 24 are arranged in a positional relationship so that they form the same angle from the center axis of the hole runner nozzle 13 toward the circumferential direction. Therefore, a pressure loss caused due to an injection resistance of the resin injected from the three resin outflow hole portions 15 is not observed, and the resin smoothly flows through the three runner groove portions 24. As a result, an injection pressure can be reduced. Accordingly, the filling velocity becomes the same in all of the three cavities 23, and a filling velocity difference between the cavities 23 can be reduced. As a result, it is possible to provide the hot-runner molding apparatus 100 that can form molded articles such as optical elements with a good shape accuracy that do not differ depending on each cavity 23 by using the three cavities 23.

Third Modification of First Embodiment

Configuration

Figure 6A:
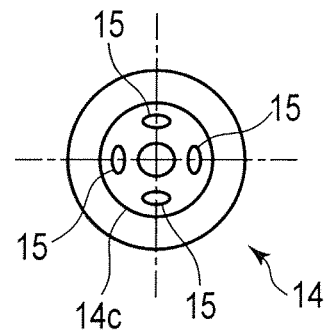
FIG. 6A is a plan view showing a third modification of the hot-runner molding apparatus according to the first embodiment and also showing an arrangement state of resin outflow hole portions of a hot-runner nozzle.
Figure 6B:
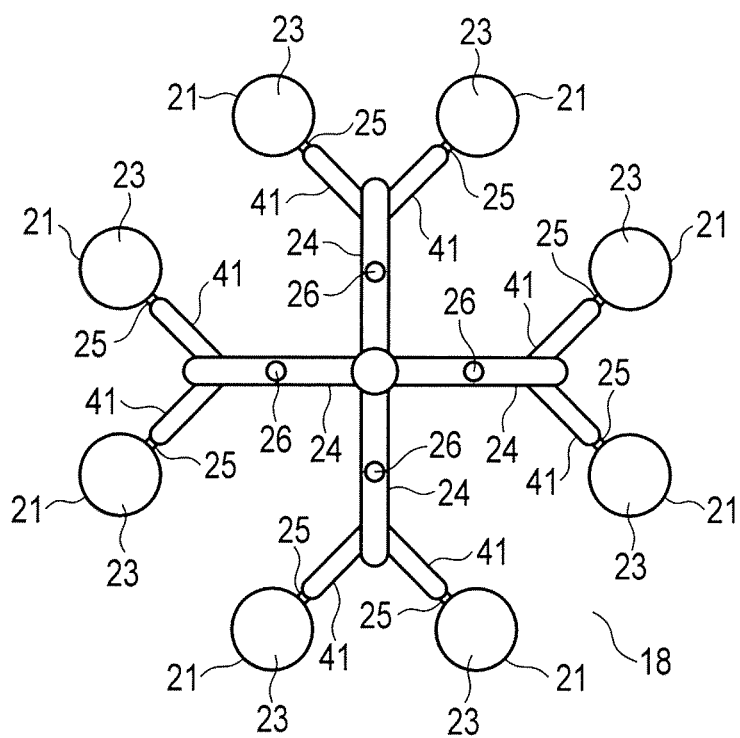
FIG. 6B is a plan view showing the third modification and also showing an arrangement state of a movable runner of the hot-runner molding apparatus.

FIG. 6A and FIG. 6B show a third modification of the hot-runner molding apparatus 100 according to the first embodiment. FIG. 6A is a plan view showing an arrangement state of the resin outflow hole portions 15 of the end tip 14, and FIG. 6B is a plan view showing an arrangement state of the movable runner groove portions 24. Note that in FIG. 6A and FIG. 6B, like reference numerals denote parts equivalent to those in the first embodiment, thus a description thereof is omitted.

In this modification, the four resin outflow hole portions 15 are arranged in the end tip 14. The four runner groove portions 24 are four linear grooves arranged on the movable side base 18 to form a radial pattern from a center pin mounting hole portion 19. In addition, two branch runner grooves 41 are branched as two grooves further arranged at an extended end portion of each runner grove portion 24. The two branch runner grooves 41 are arranged in a positional relationship so that they become line-symmetrical with a center axis of each runner groove portion 24 at the center. Thus, the gate 25 connected to the cavity 23 is provided at a tip of each branch runner groove 41. As a result, in this modification, the eight cavities 23 are provided.

Here, the same number of the resin outflow hole portions 15 of the hot runner nozzle 13 as there are runner groove portions 24 are arranged. Furthermore, the four resin outflow hole portions 15 shown in FIG. 6A are arranged in a state that they are positioned in the same directions as arrangement directions of the four runner groove portions 24 shown in FIG. 6B.

(Function/Effect)

In this modification, the positions of the equally provided four resin outflow hole portions 15 and the positions of the four runner groove portions 24 are arranged in a positional relationship so that they form the same angle from the center of the hot-runner nozzle 13 toward the circumferential direction. As a result, a pressure loss caused by an injection resistance injected from the four resin outflow hole portions 15 in the end tip 14 is not observed, and the resin smoothly flows through the four runner groove portions 24.

Also, the two branch runner grooves 41 are arranged in a positional relationship that they become line-symmetrical with the center axis of each runner groove portion at the center. As a result, a difference in a pressure loss caused by the injection resistance of the resin that flows into the two branch runner grooves 41 from each of the four runner groove portions 4 can be eliminated. Therefore, a filling velocity becomes the same in all of the eight cavities 23, and the filling velocity difference between the cavities 23 can be reduced. As a result, it is possible to provide the hot-runner molding apparatus 100 that can form molded articles such as optical elements with a good shape accuracy that do not differ depending on each cavity 23 by using the eight cavities.

Fourth Modification of First Embodiment

Configuration

Figure 7B:
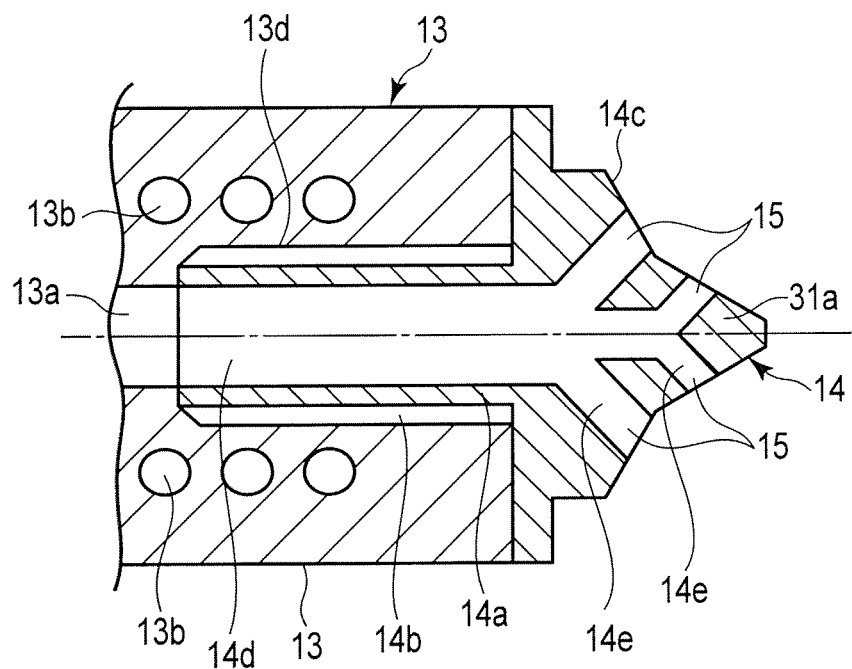
FIG. 7B is a cross-sectional view taken along a line VIIB-VIIB in FIG. 7A.

FIG. 7A and FIG. 7B show a fourth modification of the hot-runner molding apparatus 100 according to the first embodiment. FIG. 7A is a plan view showing an arrangement state of the resin outflow hole portions 15 in the end tip 14 of the hot-runner nozzle 13, and FIG. 7B is a cross-sectional view taken along a line VIIB-VIIB in FIG. 7A. Note that like reference numerals denote parts equivalent to those in the first embodiment, thus a description thereof is omitted.

In this modification, the eight resin outflow hole portions 15 are arranged in the tip head portion 14c. Four of these resin outflow hole portions 15 are equally arranged in the circumferential direction on an upstream side of the resin channels along the center axis of the ho-runner nozzle 13 as shown in FIG. 7B. The remaining four resin outflow hole portions 15 are equally arranged in the circumferential direction on a downstream side of the resin channels along the center axis of the hot-runner nozzle 13. These eight resin outflow hole portions 15 communicate with the outflow channel portions 14e.

The four resin outflow hole portions 15 on the upstream side of the resin channels and the four resin outflow hole portions 15 on the downstream side of the same are arranged at the same positions that are in one-to-one correspondence along the center axis direction of the hot-runner nozzle 13. As a result, the eight resin outflow hole portions 15 are arranged in a positional relationship so that they become line-symmetrical and point-symmetrical with the center axis of the hot-runner nozzle 13 at the center.

(Function/Effect)

In this modification, the positions of the equally-provided eight resin outflow hole portions 15 in the end tip 14 of the hot-runner nozzle 13 and the positions of the four runner groove portions 24 are arranged in a positional relationship so that they form the same angle from the center of the hot-runner nozzle 13 toward the circumferential direction. As a result, a pressure loss caused due to an injection resistance of the resin injected from the eight resin outflow portions 15 in the end tip 14 is not observed, and the resin smoothly flows through the four runner groove portions 24. Therefore, a filling velocity becomes the same in all of the four cavities 23, and the filling velocity difference between the cavities 23 can be reduced. Consequently, it is possible to provide the hot-runner molding apparatus 100 that can form molded articles such as optical elements with a good shape accuracy that does not differ for each cavity 23 by using the four cavities 23.

Fifth Modification of First Embodiment

Configuration

Figure 8:
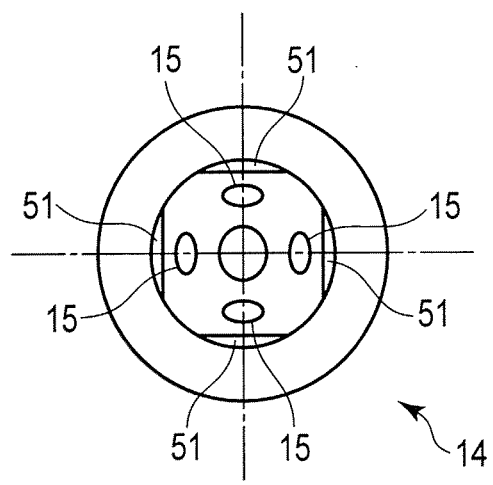
FIG. 8 is a plan view showing an arrangement state of resin outflow hole portions of a hot-runner nozzle in a fifth modification of the hot-runner molding apparatus according to the first embodiment.

FIG. 8 shows a fifth modification of a hot-runner molding apparatus 100 according to the first embodiment. FIG. 8 is a plan view showing an arrangement state of the resin outflow hole portions 15 of the hot-runner nozzle 13 according to this modification. Noted that in FIG. 8, like reference numerals denote parts equivalent to those in the first embodiment, thus a description thereof is omitted.

The end tip 14 according to this modification has chamfered portions 51 that are arranged on a wall surface of the conical tip head portion 14c facing the ring-shaped resin channel portion 31 between a guide surface 16a at the distal end portion of the hot-runner bushing 16 and the end tip 14, are arranged to be equal in number to the resin outflow hole portions 15, and are also arranged in the same directions as the arrangement directions of the runner grove portions 24. The four chamfered portions 51 are arranged in this embodiment.

(Function/Effect)

In this modification, the four chamfered portions 51, which are equal in number to the resin outflow hole portions 15, are provided, and the four chamfered portions 51 are arranged in the same directions as the arrangement directions of the four runner groove portions 24, respectively. Therefore, the positions of the equally-provided four resin outflow hole portions 15 and the four chamfered portions 51 and the positions of the four runner groove portions 24 are arranged in a positional relationship so that they form the same angle from the center of the hot-runner nozzle 13 toward the circumferential direction. Therefore, channels along which the resin injected from the hot-runner nozzle 13 reaches the molded article cavities 23 from the four resin outflow hole portions 15 via the four runner groove portions 24 and the gate 25 are the same in all the cavities 23. Therefore, a filling velocity is the same in all the cavities 23, and molded articles such as optical elements with a good shape accuracy can be obtained.

Second Embodiment

Configuration

Figure 9:
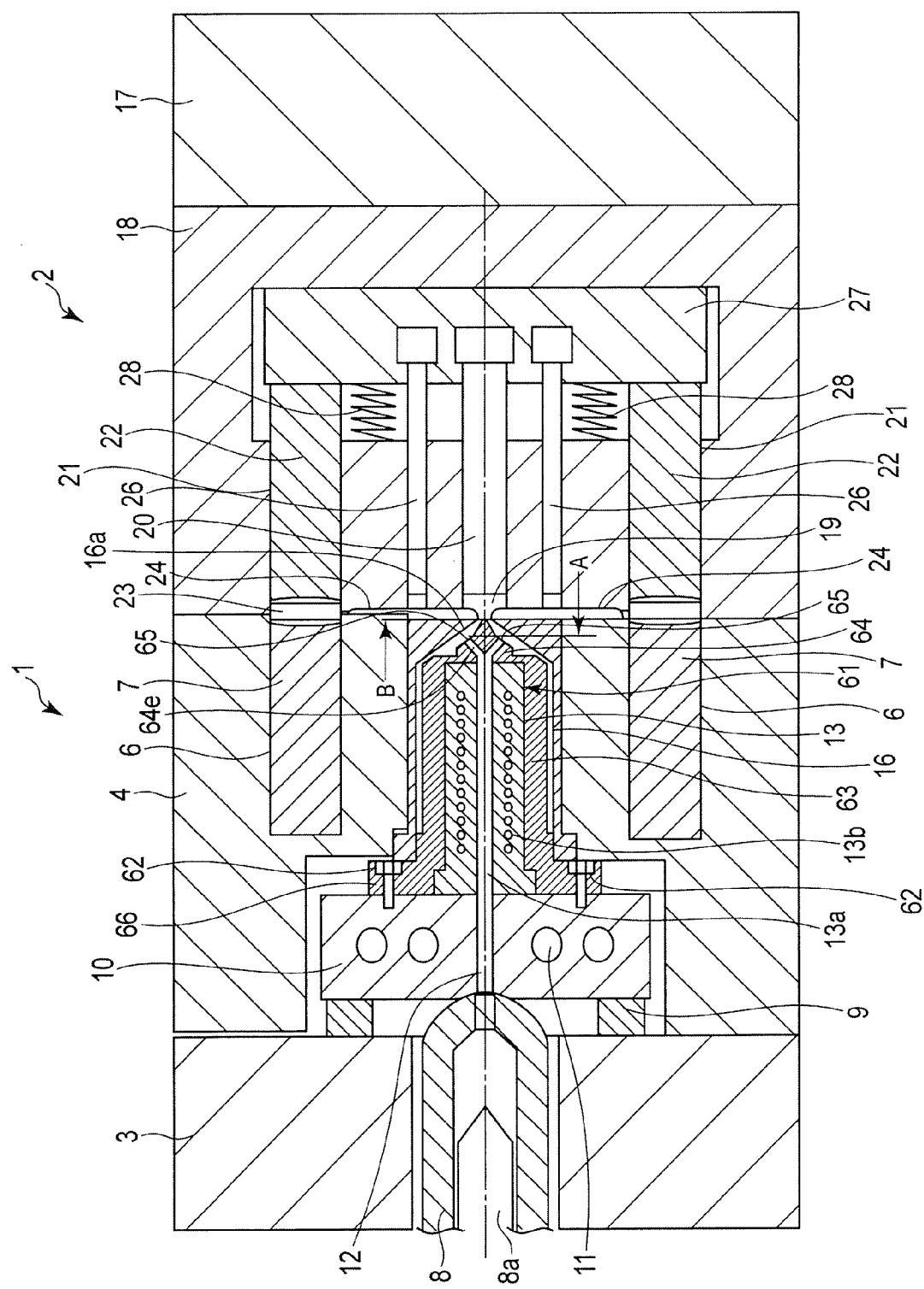
FIG. 9 is a longitudinal cross-sectional view showing a hot-runner molding apparatus according to a second embodiment of the present invention.

FIG. 9, FIG. 10, and FIG. 11 show a second embodiment according to the present invention. This embodiment that follows is an example of changing the configuration of the hot-runner nozzle 13 of the hot-runner molding apparatus 100 according to the first embodiment. FIG. 9 shows a block diagram of a four-piece hot-runner molding apparatus 100 that is an injection molding type according to this embodiment. Note that structures of the hot-runner nozzle 13 other than changed portions are the same as those in the first embodiment. Therefore, in FIG. 9, FIG. 10, and FIG. 11, like reference numerals denote parts equivalent to those in the first embodiment, thus a description thereof is omitted.

In other words, in the first embodiment, the configuration that the male screw portion 14b is screwed in the screw hole portion 13d has been described. On the other hand, in this embodiment, an end tip 61 is directly fixed to a manifold 10 by screws 62.

A hot-runner nozzle 13 has outflow channel portions 64e which communicate with an axial center channel portion 13a and are arranged inside of a distal end portion of an end tip portion 64 as a distal end portion of the hot-runner nozzle 13 that branches from the axial center channel portion 13a toward a lateral side of the axial center channel portion 13a, and through which a molten resin flows from the axial center channel portion 13a. The outflow channel portions 64e are branched from the axial center channel portion 13a and inclined with respect to a center axis of the hot-runner nozzle 13.

The end tip 61 according to this embodiment has a cylindrical member 63 that is fitted on a main body of the hot-runner nozzle 13. This cylindrical member 63 has a tip head portion 64 that is provided at a distal end portion of the cylindrical member 63 and formed into a substantially conical shape. The tip head portion 64 has resin outflow hole portions 65 which are arranged on a conical outer peripheral surface of the tip head portion 64 and from which a molten resin flows to the outside. The resin outflow hole portions 65 function as part of the outflow channel portions 64e and communicate with the outflow channel portions 64e. The same number of the resin outflow hole portions 65 as the number of molded articles formed at the same time are arranged. Therefore, in this embodiment, the four resin outflow hole portions 65 are arranged. The resin outflow hole portions 65 are arranged at equal intervals. This is likewise applied to the outflow channel portions 64e. At the distal end of the hot-runner nozzle 13, the molten resin is branched from the single axial center channel portion 13a to the four outflow channel portions 64e and injected from the respective resin outflow hole portions 65 to the outside. Additionally, the four resin outflow hole portions 65 shown in FIG. 10 are arranged in a state so that they are positioned in the same direction as the arrangement directions of the four runner groove portions 24 shown in FIG. 11, respectively.

The end tip 61 has a ring-shaped flange portion 66 that is arranged at a proximal end portion of the cylindrical member 63 and has a large diameter. This flange portion 66 has screw insertion hole portions. Distal end portions of the screws 62 inserted in the respective screw insertion hole portions are screwed and fixed to the manifold 10. As a result, the end tip 61 is directly fixed to the manifold 10 by the screws 62.

(Function)

A function of the configuration will now be described. At the time of use of the hot-runner molding apparatus 10 (at the time of replenishing the molten resin) according to this embodiment, the molten resin injected from an injection nozzle 8 passes through a resin channel portion 12 of the manifold 10 and flows from the axial center channel portion 13*a* to the resin outflow hole portions 65 via the outflow channel portions 64*e* without being substantially cooled.

Additionally, the molten resin flows from the resin outflow hole portions 65 into a ring-shaped resin channel portion 31 formed between a guide surface 16*a* of a hot-runner bushing 16 and the end tip 61 of the hot-runner nozzle 13. The molten resin then flows from the ring-shaped resin channel portion 31 into a ring-shaped gate hole portion 31*a* arranged at a distal end of the ring-shaped resin channel portion 31. Furthermore, the molten resin flows from the gate hole portion 31*a* via the four runner groove portions 24 and fills four cavities 23.

Here, the molten resin that has flowed from the axial center channel portion 13*a* of the hot-runner nozzle 13 into the end tip 61 is branched into four directions by the four resin outflow hole portions 65. At this time, each resin outflow hole portion 65 is symmetrically arranged with the center axis of the hot-runner nozzle 13 at the center. This point is likewise applied to each runner groove portion 24. Thus, the positions of the resin outflow hole portions 65 are arranged rotationally-symmetrical with respect to the positions of the runner groove portions 24. Therefore, the molten resin that has flowed into the ring-shaped resin channel portion 31 from the four resin outflow hole portions 35 flows into the four runner groove portions 24 from the gate hole portion 31*a* at the same velocity. Accordingly, the molten resin is then equally distributed to the four cavities 23 via the four runner groove portions 24 and fills the respective cavities 23.

(Effect)

In the hot-runner molding apparatus 100 according to this embodiment, the end chip 61 is directly fixed to the manifold 10 by the screws 62. Therefore, in this embodiment, the four resin outflow hole portions 65 and the four runner groove portions 24 can be fixed in a positional relationship so that they form the same angle from the center of the hot-runner nozzle 13 toward the circumferential direction. As a result, the four resin outflow hole portions 65 of the end tip 61 can be securely arranged in the directions of the four runner groove portions 24. Accordingly, a pressure loss caused by an injection resistance of the resin injected from the four resin outflow hole portions 65 is not observed, and the resin can smoothly flow through the four runner groove portions 24. Thus, an injection pressure can be decreased. For this reason, a filling velocity becomes the same in all of the four cavities 23, and the filling velocity difference between the cavities 23 can be further effectively reduced. As a result, it is possible to provide the hot-runner molding apparatus 100 that can form molded articles such as optical elements with a good shape accuracy that does not differ for each cavity 23 by using the four cavities 23. Furthermore, in this embodiment, since the resin channels become shortest and the pressure loss is reduced, responsiveness can be improved with a low load, and molded articles with good shape accuracy can be obtained.

The present invention is effective for a technical field that uses the hot-runner molding apparatus 100 that form molded articles such as optical elements made of a resin based on injection molding, or a technical field that manufactures molded articles such as optical elements made of a resin based on injection molding.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A hot-runner molding apparatus comprising:
   a hot-runner nozzle which includes:
      an axial center channel extending along a center axis and terminating at a distal end; and
      n outflow channels, n being an integer greater than one, each outflow channel extending at an acute angle relative to the central axis from the distal end to a respective outflow hole such that when molten resin flows downstream through the center channel into the outflow channels it exists through the outflow holes;
   a tubular hot-runner molding die into which a distal end of the hot-runner nozzle extends, an outer peripheral surface of the hot-runner nozzle and an inner peripheral surface of the tubular hot-runner molding die cooperating to form an exit channel extending from the outflow holes to a gate located downstream of the outflow holes relative to the flow direction of the molten resin; and
   a multi-piece runner unit having n mold cavities and n runners, each runner extending from the gate to a respective one of the mold cavities in a radial direction relative to the central axis such that n molded articles can be cast simultaneously;
   the positions of the outflow holes being arranged rotationally-symmetrical with respect to the positions of the runners in such a manner that when the molten resin flows downstream from the exit channel, through the gate and into the runners it is equally distributed between the runners.

2. The hot-runner molding apparatus according to claim 1, wherein each of the outflow holes is located in the same circumferential position as a respective one of the runners relative to the central axis.

3. The hot-runner molding apparatus according to claim 1, wherein the hot-runner nozzle comprises a main body and an end tip detachably connected to the main body, the outflow channels being formed in the end tip.

4. The hot-runner molding apparatus according to claim 3, wherein the end tip has n chamfered portions arranged on a wall surface of the end tip and facing the exit channel, each chamfered portion being located in the same circumferential position as a respective one of the runners relative to the central axis.

5. The hot-runner molding apparatus according to claim 1, wherein the exit channel is conical in shape.

6. A hot-runner comprising:
   a hot-runner nozzle which includes:
      an axial center channel extending along a center axis and terminating at a distal end; and
      n outflow channels, n being an integer greater than one, each outflow channel extending at an acute angle relative to the central axis from the distal end to a respective outflow hole such that when molten resin flows downstream through the center channel into the outflow channels it exists through the outflow holes;

a tubular hot-runner molding die into which a distal end of the hot-runner nozzle extends, an outer peripheral surface of the hot-runner nozzle and an inner peripheral surface of the tubular hot-runner molding die cooperating to form an exit channel extending from the outflow holes to a gate located downstream of the outflow holes relative to the flow direction of the molten resin; and a multi-piece runner unit having n runners, each runner extending from the gate in a radial direction relative to the central axis;

the positions of the outflow holes being arranged rotationally-symmetrical with respect to the positions of the runners in such a manner that when the molten resin flowing downstream from the exit channel, through the gate and into the runners it is equally distributed between the runners.

7. The hot-runner according to claim 6, wherein each of the outflow holes is located in the same circumferential position as a respective one of the runners relative to the central axis.

8. The hot-runner according to claim 6, wherein the hot-runner nozzle comprises a main body and an end tip detachably connected to the main body, the outflow channels being formed in the end tip.

9. The hot-runner according to claim 8, wherein the end tip has n chamfered portions arranged on a wall surface of the end tip and facing the exit channel, each chamfered portion being located in the same circumferential position as a respective one of the runners relative to the central axis.

10. The hot-runner according to claim 6, wherein the exit channel is conical in shape.

* * * * *